US 006717073B2

(12) United States Patent
Xu et al.

(10) Patent No.: US 6,717,073 B2
(45) Date of Patent: Apr. 6, 2004

(54) WIRELESS DISPLAY SYSTEMS, STYLI, AND ASSOCIATED METHODS

(75) Inventors: Jianping Xu, Portland, OR (US); Stephen H. Hunt, Felton, CA (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 09/751,048

(22) Filed: Dec. 29, 2000

(65) Prior Publication Data

US 2002/0084114 A1 Jul. 4, 2002

(51) Int. Cl.⁷ .......................... G06K 11/06; G09G 5/00
(52) U.S. Cl. ..................... 178/18.04; 178/19.02; 345/177; 345/179
(58) Field of Search ................. 345/173–180, 345/156; 178/18.01, 18.02, 18.03, 18.04, 19.01, 19.02, 19.07

(56) References Cited

U.S. PATENT DOCUMENTS

| | | | |
|---|---|---|---|
| 4,012,588 A | 3/1977 | Davis et al. | |
| 4,506,354 A | 3/1985 | Hansen | |
| 4,507,557 A | 3/1985 | Tsikos | 250/341 |
| 4,758,691 A | 7/1988 | De Bruyne | |
| 4,814,552 A | * 3/1989 | Stefik et al. | 178/19.02 |
| 4,862,152 A | 8/1989 | Milner | |
| 5,142,506 A | 8/1992 | Edwards | |
| 5,308,936 A | 5/1994 | Biggs et al. | |
| 5,317,140 A | 5/1994 | Dunthorn | 250/221 |
| 5,517,579 A | 5/1996 | Baron et al. | |
| 5,526,023 A | * 6/1996 | Sugimoto et al. | 345/173 |
| 5,570,299 A | * 10/1996 | Tokioka et al. | 702/150 |
| 5,686,705 A | * 11/1997 | Conroy et al. | 178/18.05 |
| 5,781,451 A | 7/1998 | Lofthus et al. | |
| 5,945,981 A | 8/1999 | Paull et al. | |
| 5,977,958 A | 11/1999 | Baron et al. | |
| 6,008,798 A | 12/1999 | Mato, Jr. et al. | 345/168 |

(List continued on next page.)

FOREIGN PATENT DOCUMENTS

| | | | |
|---|---|---|---|
| EP | 0312481 | 4/1989 | G06K/11/06 |
| EP | 0753723 | 1/1997 | G01K/1/00 |
| EP | 1128320 | 8/2001 | G06K/11/18 |
| FR | 2664423 | 1/1992 | G08B/13/00 |
| FR | 2698191 | 5/1994 | G06F/15/66 |
| JP | 11-203043 | * 7/1999 | |
| WO | WO-00/23939 | 4/2000 | G06K/11/14 |
| WO | WO00/28348 | 5/2000 | |
| WO | WO-0073976 | 12/2000 | G06K/9/22 |

OTHER PUBLICATIONS

"Getting Started With Your Mimo", *Virtual Ink, Owners Manual,* (1999).
"Mimio Installation", *Virtual Ink,* www.mimio.com/support,4 pgs.
Brenner, A.E., et al., "A Sonic Pen: A Digital Stylus System", *IEEE Transactions On Computers, C–19,* (Jun. 1970), 546–548.

*Primary Examiner*—Amr Ahmed Awad
(74) *Attorney, Agent, or Firm*—Schwegman, Lundberg, Woessner & Kluth, P.A.

(57) ABSTRACT

A wireless coordinate input system for a display system includes a stylus that transmits ultrasonic energy to a plurality of ultrasonic receiving stations in a projection plane. The stylus may include one ultrasonic transmitter used for determination of three-dimensional coordinates of the stylus relative to the projection plane. The stylus may also include a second ultrasonic transmitter controlled by a pressure-activated switch. When the stylus is pressed against the projection plane, the second transmitter turns on and is used for determination of two-dimensional coordinates of the stylus in the projection plane. The stylus may also include a higher frequency burst transmitter used to generate a time reference. One or more of the ultrasonic receiving stations may also include an ultrasonic transmitter for calibration.

9 Claims, 5 Drawing Sheets

U.S. PATENT DOCUMENTS

| | | | |
|---|---|---|---|
| 6,100,538 A | 8/2000 | Ogawa | 250/559.29 |
| 6,184,873 B1 * | 2/2001 | Ward et al. | 345/179 |
| 6,208,330 B1 * | 3/2001 | Hasegawa et al. | 345/173 |
| 6,288,711 B1 * | 9/2001 | Tanaka et al. | 345/179 |
| 6,504,530 B1 * | 1/2003 | Wilson et al. | 345/173 |
| 2001/0000666 A1 | 5/2001 | Wood et al. | |
| 2002/0134594 A1 * | 9/2002 | Taylor et al. | 178/18.01 |

* cited by examiner

WIRELESS DISPLAY SYSTEMS, STYLI, AND ASSOCIATED METHODS

TECHNICAL FILED

The subject matter relates generally to input devices for computers and, more specifically, to input devices for generating input coordinates in display systems.

BACKGROUND

Many different input devices exist for today's computer systems. Examples include keyboards, mice, graphics tablets, and touch screens. These devices have become widely available for desktop and laptop computer systems. Display systems (computer systems that project their displays) have fewer input devices readily available.

Input devices currently available for display systems include handheld mice, speech systems, and body gesture equipment such as virtual reality gloves. Handheld mice often operate with an infrared (IR) link to the computer. IR handheld mice are useful, but they interact with an IR receiver and not the display, so a user must have a line-of-sight path available to the IR receiver, which is often located at the computer. Speech systems have difficulty providing drawing capability, and body gestures have a small recognition domain.

For the reasons stated above, and for other reasons stated below that will become apparent to those skilled in the art upon reading and understanding the subject matter there is a need in the art for an alternate input device for display systems.

DESCRIPTION OF EMBODIMENTS

Figure 1:
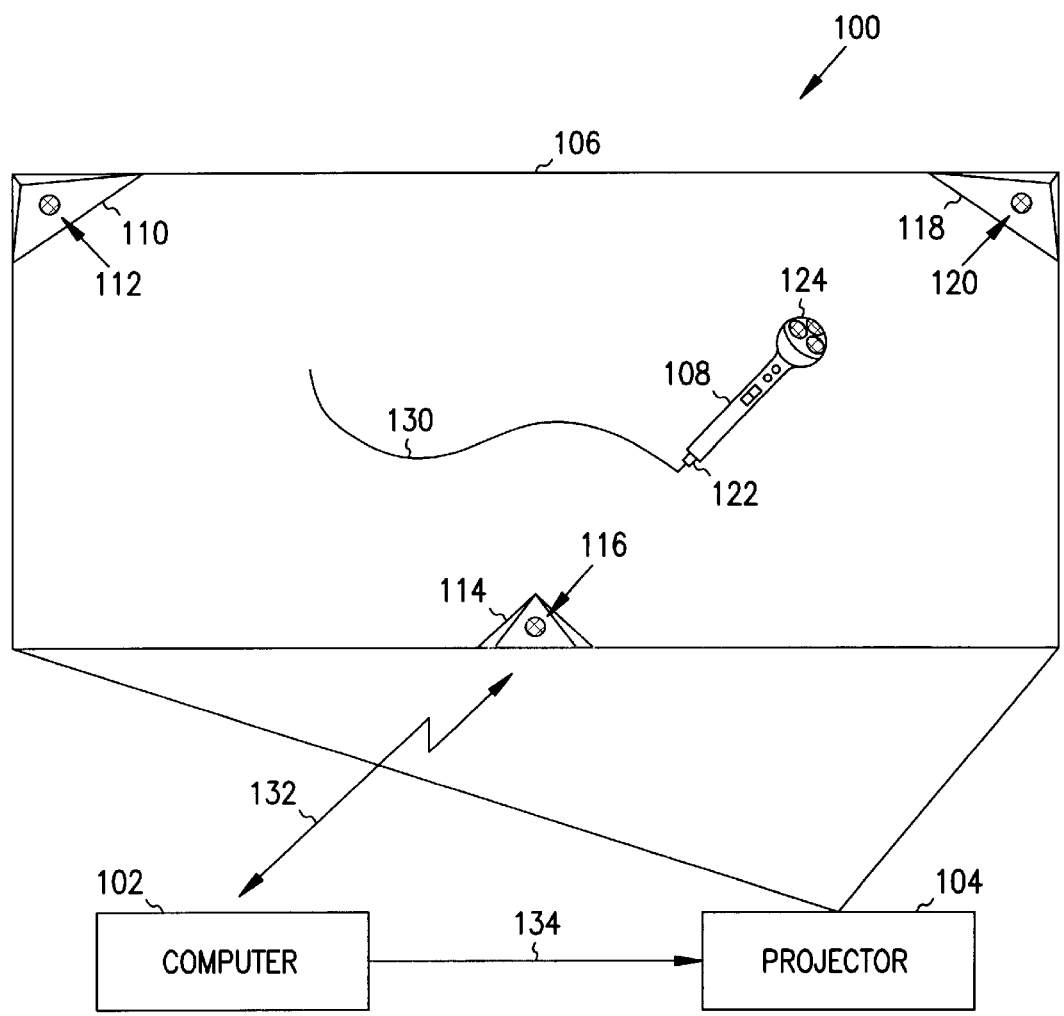
FIG. 1 shows a coordinate input system, according to an embodiment of the subject matter.

In the following detailed description of the embodiments, reference is made to the accompanying drawings that show, by way of illustration, specific embodiments in which the subject matter may be practiced. In the drawings, like numerals describe substantially similar components throughout the several views. These embodiments are described in sufficient detail to enable those skilled in the art to practice them. Other embodiments may be utilized, and structural, logical, and electrical changes may be made without departing from the scope of the subject matter. Moreover, it is to be understood that the various embodiments of the subject matter, although different, are not necessarily mutually exclusive. For example, a particular feature, structure, or characteristic described in one embodiment may be included within other embodiments. The following detailed description is, therefore, not to be taken in a limiting sense, and the scope of the subject matter is defined only by the appended claims, along with the full scope of equivalents to which such claims are entitled.

The methods and apparatus of the subject matter provide a mechanism to input coordinates to a large display system. A projection system coupled to a computer displays information on a projection surface. A stylus emits ultrasonic energy that is received by a plurality of receiving stations on the projection surface, and the receiving stations can triangulate the position of the stylus. The stylus has two ultrasonic transmitters. One transmitter is controlled by a manually-activated switch, and it is used for determining three-dimensional coordinates of the stylus relative to the projection surface. Another transmitter is controlled by a pressure-activated switch. The pressure-activated switch is turned on when the stylus is pressed against the projection surface.

FIG. 1 shows a coordinate input system 100, according to an embodiment of the subject matter. Coordinate input system 100 includes computer 102, projector 104, stylus 108, and receiving stations 110, 114, and 118. Stylus 108 includes ultrasonic transmitters 122 and 124; and stations 110, 114, and 118 include ultrasonic receivers 112, 116, and 120, respectively. Computer 102 sends display information to projector 104 on link 134. Projector 104 projects the display information on projection surface 106. Stylus 108 functions as an input device to computer 102 by interacting with stations 110, 114, and 118, which, in turn, send stylus coordinate information to computer 102 on link 132.

In some embodiments, projection surface 106 is a wall, and projector 104 projects display information onto the wall. In other embodiment, projection surface 106 is a screen, and projector 104 is located behind the screen such that information projected can be viewed from in front of the screen. Stations 110, 114, and 118 are mountable on projection surface 106. In some embodiment, stations 110, 114, and 118 are rigidly affixed to projection surface 106. For example, in embodiments that include a screen dedicated as projection surface 106, stations 110, 114, and 118 can be dedicated to the projection surface. In other embodiments, stations 110, 114, and 118 are not rigidly affixed to projection surface 106. For example, in embodiments where projection surface 106 is a wall, stations 110, 114, and 118 can be portable such that they can be mounted on any wall. In some embodiments, stations 110, 114, and 118 can be placed on walls of different size and shape to accommodate different displays generated by projector 104.

Stylus 108 includes ultrasonic transmitters 122 and 124. In some embodiments, ultrasonic transmitter 122 is used to input two-dimensional coordinate information, and ultrasonic transmitter 124 is used to input three-dimensional coordinate information. Ultrasonic transmitter 122 can be activated by a pressure-activated switch. When stylus 108 is pressed against projection surface 106, ultrasonic transmitter 122 turns on. Ultrasonic energy transmitted from ultrasonic transmitter 122 is received by stations 110, 114, and 118, and stylus coordinate information is sent to computer 102.

Computer 102 can utilize stylus coordinate information for any suitable purpose. For example, line 130 is shown as having been traced on projection surface 106 by stylus 108. As stylus 108 moves along line 130, computer 102 sends display information to projector 104 that includes line 130. As shown in the example of FIG. 1, ultrasonic transmitter 122 is used for two-dimensional coordinate input on projection service 106. In embodiments that only use stylus 108 for two-dimensional coordinate input, one of stations 110, 114, and 118 can be omitted; however, use of more than two stations can provide better accuracy through redundant information, or can provide a larger coverage range.

In some embodiments, ultrasonic transmitter 124 is used to input three-dimensional coordinate information. In these embodiments, ultrasonic transmitter 124 is turned on, and the location of stylus 108 is tracked in three dimensions by stations 110, 114, and 118.

Ultrasonic transmitters 122 and 124 can emit ultrasonic energy at any suitable frequency. In some embodiments, ultrasonic transmitters 122 and 124 emit energy at between 40 kHz and 80 kHz. Ultrasonic transmitters 122 and 124 can transmit at the same frequency, or at different frequencies. In embodiments where ultrasonic transmitters 122 and 124 transmit at the same frequency, ultrasonic receivers 112, 116, and 120 are designed to receive ultrasonic energy at the frequency transmitted. In embodiments where ultrasonic transmitters 122 and 124 transmit at different frequencies, each of receiving stations 110, 114, and 118 includes receivers to receive ultrasonic energy at least two frequencies.

Ultrasonic transmitters 122 and 124 emit ultrasonic energy in bursts or pulses. In some embodiments, bursts are emitted at a rate of between 50 and 100 pulses per second. In some embodiments, stylus 108 includes a higher frequency transmitter in addition to ultrasonic transmitters 122 and 124. A corresponding higher frequency receiver is included in at least one of receiving stations 110, 114, and 118. The higher frequency transmitter is also a burst transmitter that can be used as a time reference for ultrasonic receivers 112, 116, and 120. The higher frequency transmitter can be, for example, a radio frequency (RF) transmitter or an infrared (IR) transmitter. Because the velocity of the higher frequency signals is much greater than the velocity of the ultrasonic energy, they are used as a time reference.

Stations 110, 114, and 118 receive the ultrasonic bursts, and at least one of stations 110, 114, and 118 receives the higher frequency bursts. In some embodiments, stations 110, 114, and 118 include processors that calculate the time of arrival of the ultrasonic bursts. Stations 110, 114, and 118 transfer the time of arrival to computer 102 using a wireless interface, such as the "Bluetooth" interface.

Figure 2:
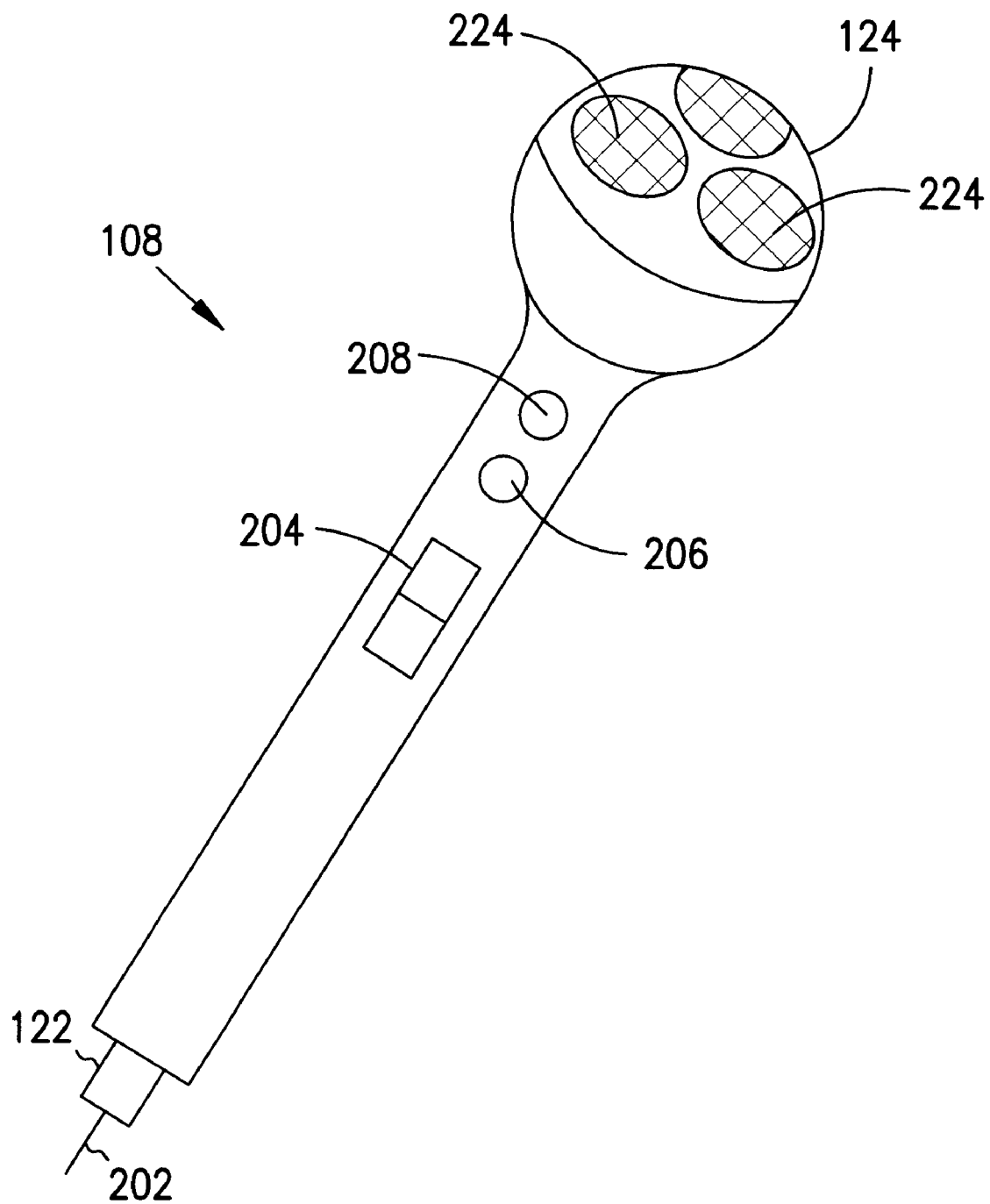
FIG. 2 shows a stylus, according to an embodiment of the subject matter.

FIG. 2 shows a stylus 108, according to an embodiment of the subject matter. Stylus 108 includes ultrasonic transmitter 122 near one end, ultrasonic transmitter 124 near another end, switch 204, and buttons 206 and 208. Switch 204 is used to select between absolute and relative coordinates. Either of buttons 206 and 208 operates a momentary manual switch that turns on ultrasonic transmitter 124. Buttons 206 and 208 can also emulate left and right mouse buttons.

In some embodiments, ultrasonic transmitter 124 includes a plurality of piezoelectric discs 224 arranged in a semi-hemispherical pattern. Piezoelectric discs 224 emit ultrasonic energy when switch 206 is on. Stylus 108 can be in any position relative to the receiving stations when switch 204 is turned on, and the position of stylus 108 can be triangulated by the receiving stations, or by computer 102 (FIG. 1).

Ultrasonic transmitter 122 is positioned near tip 202, which is coupled to a pressure-activated switch (not shown). When tip 202 is pressed against a surface such as projection surface 106 (FIG. 1), ultrasonic transmitter 122 turns on and emits ultrasonic energy. In some embodiments, ultrasonic transmitter 122 is a cylindrical, omni-directional transmitter made of a polymer material. The cylindrical shape allows tip 202 to pass through, and the omni-directional pattern allows receivers on the projection surface to receive the ultrasonic energy at an acceptable amplitude.

Figure 3:
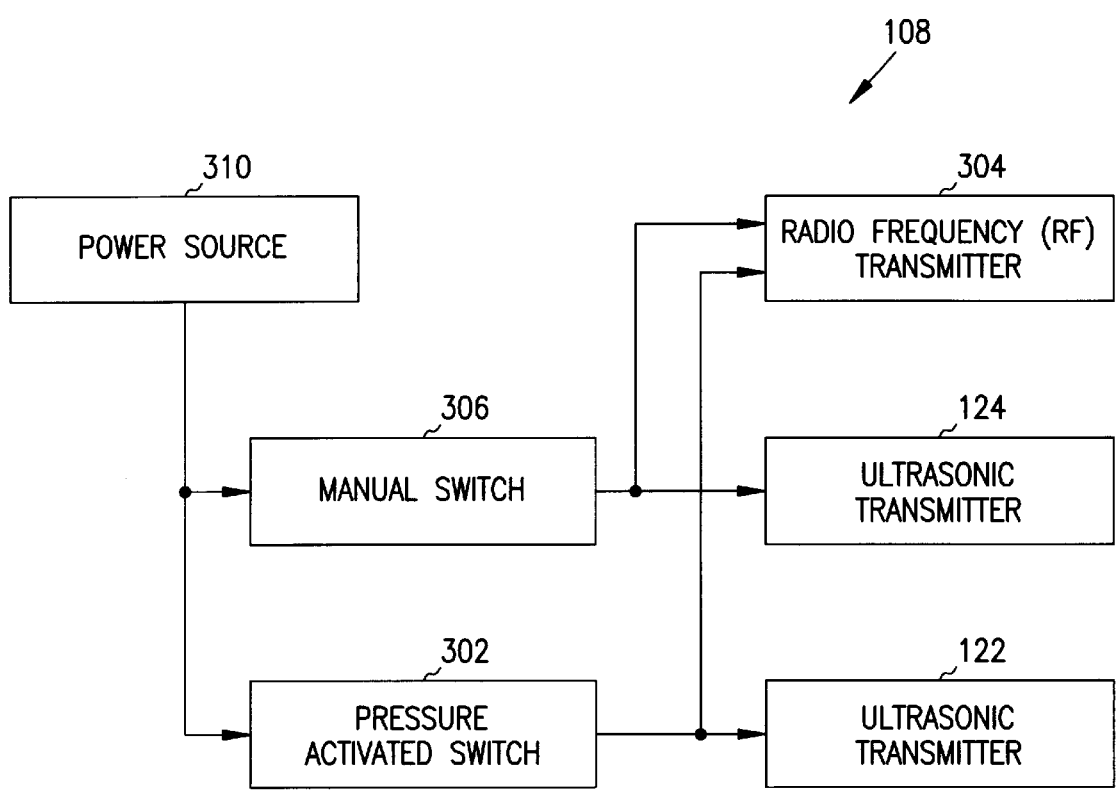
FIG. 3 shows a block diagram of a stylus, according to an embodiment of the subject matter.

FIG. 3 shows a block diagram of a stylus 108, according to an embodiment of the subject matter. Stylus 108 includes power source 310, manual switch 306, pressure-activated switch 302, RF transmitter 304, and ultrasonic transmitters 122 and 124. RF transmitter 304 is turned on when either of manual switch 306 or pressure-activated switch 302 is closed. When turned on, RF transmitter 304 transmits periodic RF pulses from stylus 108. Manual switch 306 is turned on whenever either of buttons 206 or 208 (FIG. 2) is depressed, and pressure-activated switch 302 is closed whenever pressure is applied to tip 202 (FIG. 2).

RF transmitter 304 is an example of a higher frequency transmitter suitable for use as a time reference between the stylus and a receiving station. Other types of higher frequency transmitters can be used without departing from the scope of the subject matter. For example, in other embodiments, an infrared (IR) transmitter is used.

Figure 4:
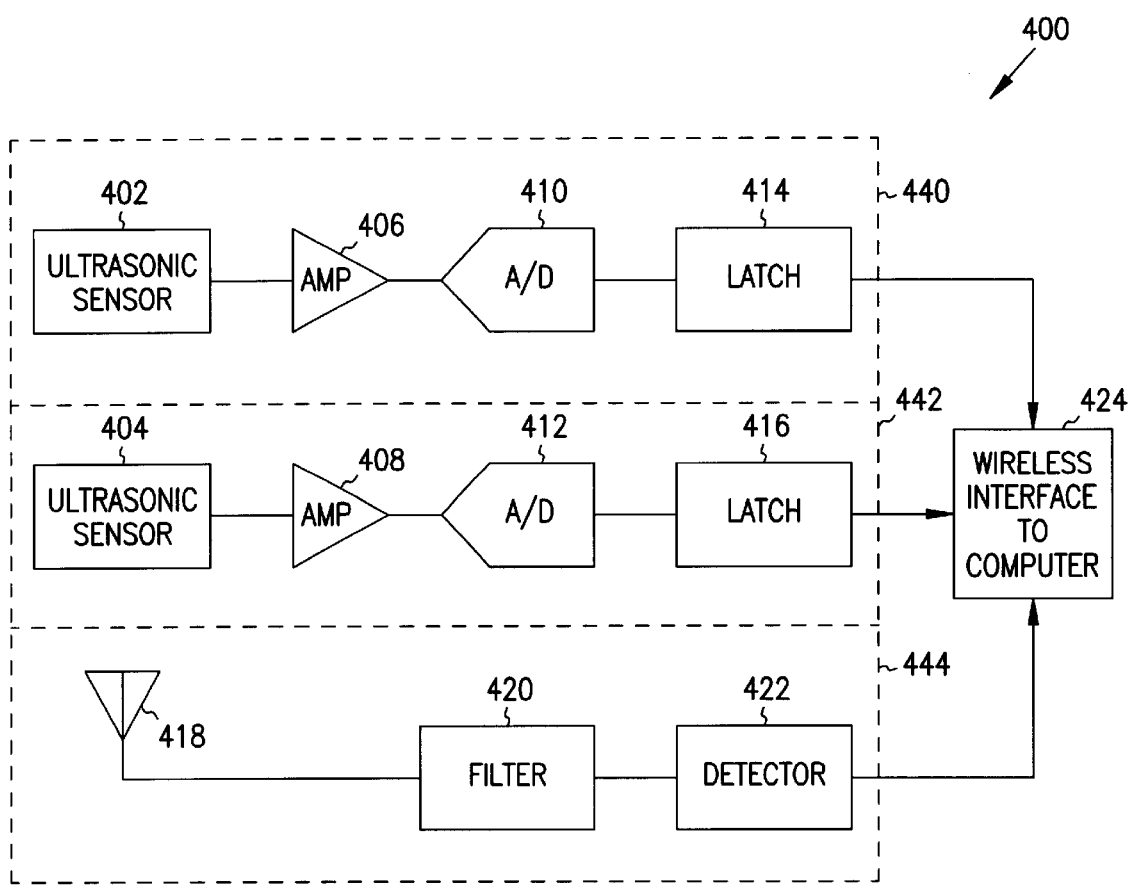
FIG. 4 shows a block diagram of a receiving station, according to an embodiment of the subject matter.

FIG. 4 shows a block diagram of a receiving station 400, according to an embodiment of the subject matter. Receiving station 400 is a receiving station such as receiving stations 110, 114, or 118 (FIG. 1). Receiving station 400 includes ultrasonic receivers 440 and 442, and RF receiver 444. Ultrasonic receiver 440 includes ultrasonic sensor 402, amplifier 406, analog-to-digital converter (A/D) 410, and latch 414. Ultrasonic receiver 442 includes ultrasonic sensor 404, amplifier 408, A/D 412, and latch 416. RF receiver 444 includes antenna 418, filter 420, and detector 422. Each of receivers 440, 442, and 444 provides information to wireless interface 424.

In the embodiment of FIG. 4, two ultrasonic receivers 440 and 442 are used. In some embodiments, amplifiers 406 and 408 include narrowband filters centered at different frequencies. This provides two ultrasonic receivers at different frequencies to receive ultrasonic signals from a stylus with two transmitters at different frequencies. In other embodiments, both transmitters on the stylus are at the same frequency, and one of ultrasonic receivers 440 and 442 is omitted.

RF receiver 444 receives radio frequency pulses, detects the time of arrival of the pulses, and provides the time of arrival to wireless interface 424. Ultrasonic receivers 440 and 442 receive ultrasonic pulses, and they provide the time of arrival of the ultrasonic pulses to wireless interface 424. Wireless interface 424 provides the time of arrival information to a computer such as computer 102 (FIG. 1). In some embodiments, wireless interface 424 includes a processor that determines the difference between the time of arrivals of RF pulses and ultrasonic pulses, and it provides the difference to the computer.

Figure 5:
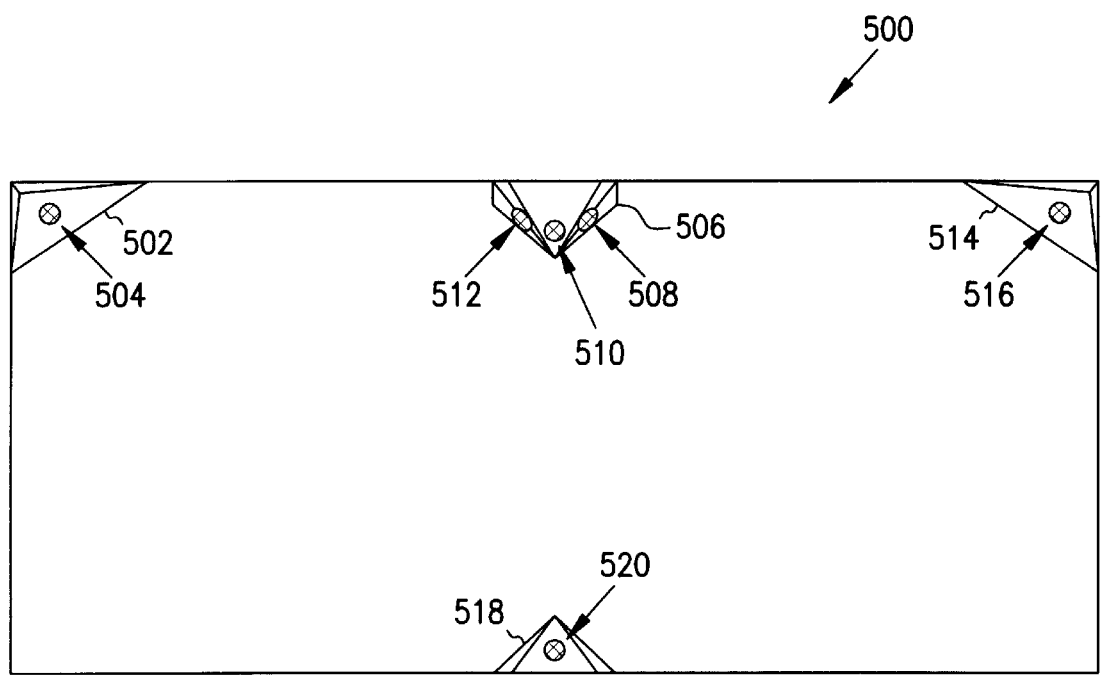
FIG. 5 shows a self-calibrating coordinate input system, according to an embodiment of the subject matter.

FIG. 5 shows a self-calibrating coordinate input system 500, according to an embodiment of the subject matter. Coordinate input system 500 includes receiving stations 502, 514, and 518. Receiving stations 502, 514, and 518 correspond to receiving stations 110, 114, and 118 of FIG. 1, respectively. Coordinate input system 500 also includes calibrating station 506. Calibrating station 506 is used to calibrate the distance between receiving stations, and in some embodiments it is also used as a receiving station in addition to those shown in FIG. 1.

Calibrating station 506 includes ultrasonic receiver 510, and it also includes ultrasonic transmitters 512 and 508. Ultrasonic transmitters 512 and 508 are useful to calibrate coordinate input system 500. When the receiving stations are hung on a wall to provide a projection surface, ultrasonic transmitters transmit ultrasonic energy at the same frequency as a stylus. The energy is received at the other receiving stations, and the time of arrival is communicated either back to calibrating station 506, or to a computer such as computer 102 (FIG. 1). The distance between receiving stations is then determined, and the system is calibrated.

In some ebodiments, calibrating station 506 also includes a higher frequency transmitter to provide bursts of a higher frequency signal for use by the other receiving stations. For example, calibrating station 506 can include an RF transmitter to provide a time reference in the same manner as stylus 108 (Figure).

It is to be understood that the above description is intended to be illustrative, and not restrictive. Many other embodiments will be apparent to those of skill in the art upon reading and understanding the above description. The scope of embodiments of the subject matter should, therefore, be determined with reference to the appended claims, along with the full scope of equivalents to which such claims are entitled.

What is claimed is:

1. A method of operating an ultrasonic coordinate input system comprising:

transmitting a burst of ultrasonic energy from an ultrasonic transmitter in a projection plane;

receiving the burst of ultrasonic energy at a receiver an unknown distance away from the ultrasonic transmitter in the projection plane;

determining the unknown distance from a propagation time of the ultrasonic energy;

receiving at the receiver a higher frequency burst signal from a stylus;

receiving at the receiver ultrasonic signals from the stylus;

receiving at an additional receiver in the projection plane ultrasonic signals from the stylus;

triangulating the position of the stylus relative to the projection plane; and when the ultrasonic signals from the stylus are at a first frequency, triangulating in two dimensions; and when the ultrasonic signals from the stylus are at a second frequency, triangulating in three dimensions.

2. The method recited in claim 1, wherein the higher frequency burst signal comprises a radio frequency signal.

3. The method recited in claim 1, wherein the transmitter and the additional receiver are co-located.

4. A method comprising:

transmitting a burst of ultrasonic energy from an ultrasonic transmitter in a projection plane;

receiving the burst of ultrasonic energy at a first receiver an unknown distance away from the ultrasonic transmitter in the projection plane;

determining the unknown distance from a propagation time of the ultrasonic energy;

receiving at the first receiver ultrasonic signals from a stylus;

receiving at two additional receivers in the projection plane ultrasonic signals from the stylus;

triangulating the position of the stylus relative to the projection plane; and when the ultrasonic signals from the stylus are at a first frequency, triangulating in two dimensions, using two of the receivers; and when the ultrasonic signals from the stylus are at a second frequency, triangulating in three dimensions, using three of the receivers.

5. The method recited in claim 4, wherein the transmitter and one of the additional receivers are co-located.

6. The method recited in claim 4, and further comprising:

receiving at the first receiver a higher frequency burst signal from the stylus; and using the higher frequency burst signal as a time reference for at least one of the receivers.

7. A method comprising:

receiving at a first receiver in a projection plane of a projection system ultrasonic signals from a stylus;

receiving at two additional receivers in the projection plane ultrasonic signals from the stylus;

triangulating the position of the stylus relative to the projection plane;

when the ultrasonic signals from the stylus are at a first frequency, triangulating in two dimensions; and when the ultrasonic signals from the stylus are at a second frequency, triangulating in three dimensions; and receiving at the first receiver a higher frequency burst signal from the stylus; and using the higher frequency burst signal as a time reference for at least one of the receivers.

8. The method recited in claim 7, and further comprising:

one of the additional receivers receiving ultrasonic signals from a transmitter co-located with the other of the additional receivers.

9. The method recited in claim 7, wherein the higher frequency burst signal comprises a radio frequency signal.

* * * * *

UNITED STATES PATENT AND TRADEMARK OFFICE
CERTIFICATE OF CORRECTION

PATENT NO. : 6,717,073 B2
DATED : April 6, 2004
INVENTOR(S) : Xu et al.

It is certified that error appears in the above-identified patent and that said Letters Patent is hereby corrected as shown below:

<u>Title page,</u>
Item [56], References Cited, FOREIGN PATENT DOCUMENTS, delete "G01K/1/00" and insert -- G01H1/00 --, therefor.

Signed and Sealed this

Twenty-seventh Day of July, 2004

JON W. DUDAS
*Acting Director of the United States Patent and Trademark Office*